United States Patent [19]

Marshall

[11] Patent Number: 4,840,141
[45] Date of Patent: Jun. 20, 1989

[54] AUTOMATIC MILKING APPARATUS

[75] Inventor: Barry R. Marshall, Ramsden, England

[73] Assignee: Ambic Equipment Limited, Withey, England

[21] Appl. No.: 46,692

[22] Filed: May 7, 1987

[30] Foreign Application Priority Data

May 10, 1986 [GB] United Kingdom ............... 8611471

[51] Int. Cl.⁴ ............................................. A01J 5/04
[52] U.S. Cl. .................................................. 119/14.47
[58] Field of Search ............... 119/14.47, 14.48, 14.49, 119/14.50, 14.51, 14.52, 14.53, 14.54, 14.55

[56] References Cited

U.S. PATENT DOCUMENTS 3,255,732  6/1966  Raht .................................. 119/14.52

FOREIGN PATENT DOCUMENTS 0139081  12/1979  Denmark ......................... 119/14.47
159259    6/1957   Sweden ............................ 119/14.51
0665861   6/1979   U.S.S.R. .......................... 119/14.47
0961611   10/1982  U.S.S.R. .......................... 119/14.47
1113053   9/1984   U.S.S.R. .......................... 119/14.47
1265633   of 0000  United Kingdom .
2102665   of 0000  United Kingdom .

*Primary Examiner*—Gene Mancene
*Assistant Examiner*—R. Thomas Price
*Attorney, Agent, or Firm*—Larson and Taylor

[57] ABSTRACT

Automatic milking apparatus for hydraulic milking, in which there is no air bleed at or upstream of the clawpiece during milking of a cow. Each teat cup has a liner within the rigid teat cup shell which has a passage through which air may be admitted to the liner body from an air admission tube, at will after milking and before removal of the teat cups from the cow. The air admission tube runs from the linear body passage, between the liner and shell, through the pulse tube and into the clawpiece, where air admission is manually controlled.

2 Claims, 3 Drawing Sheets

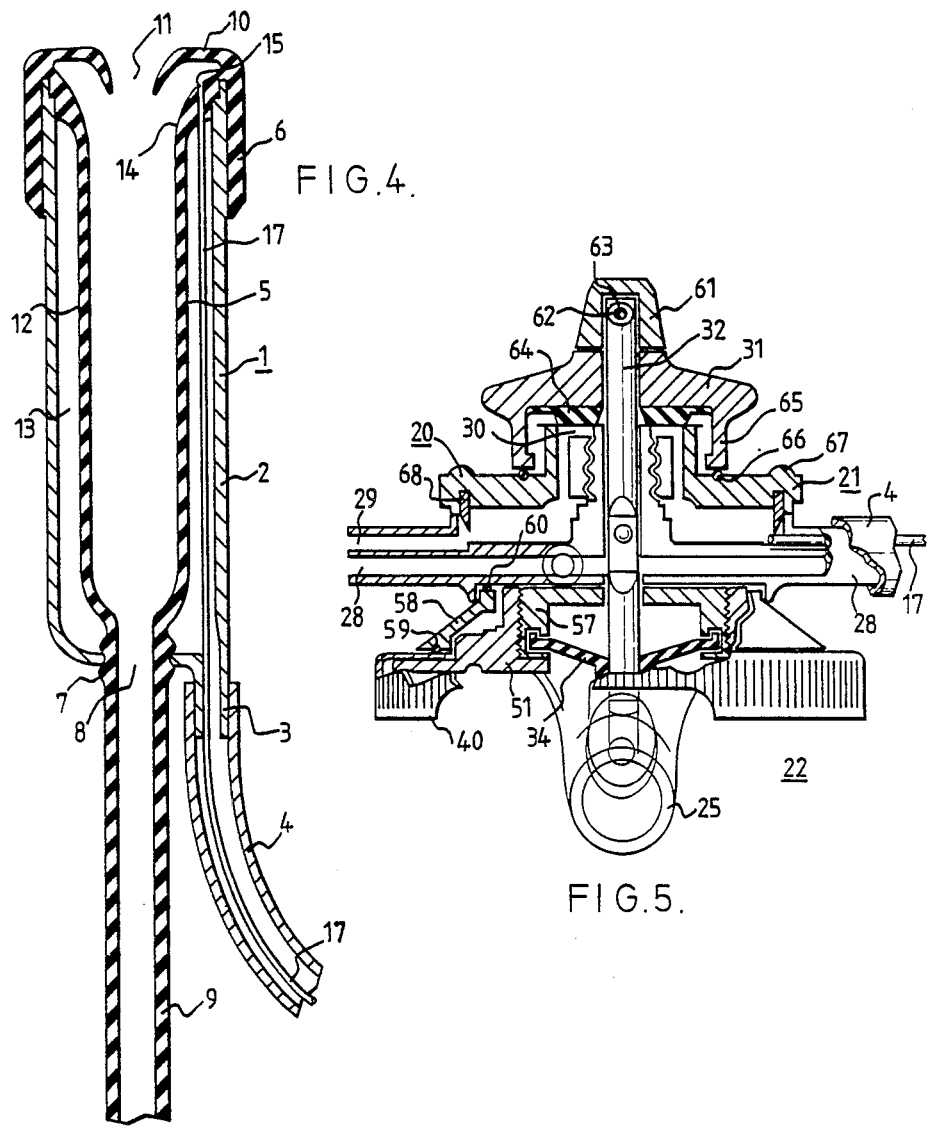

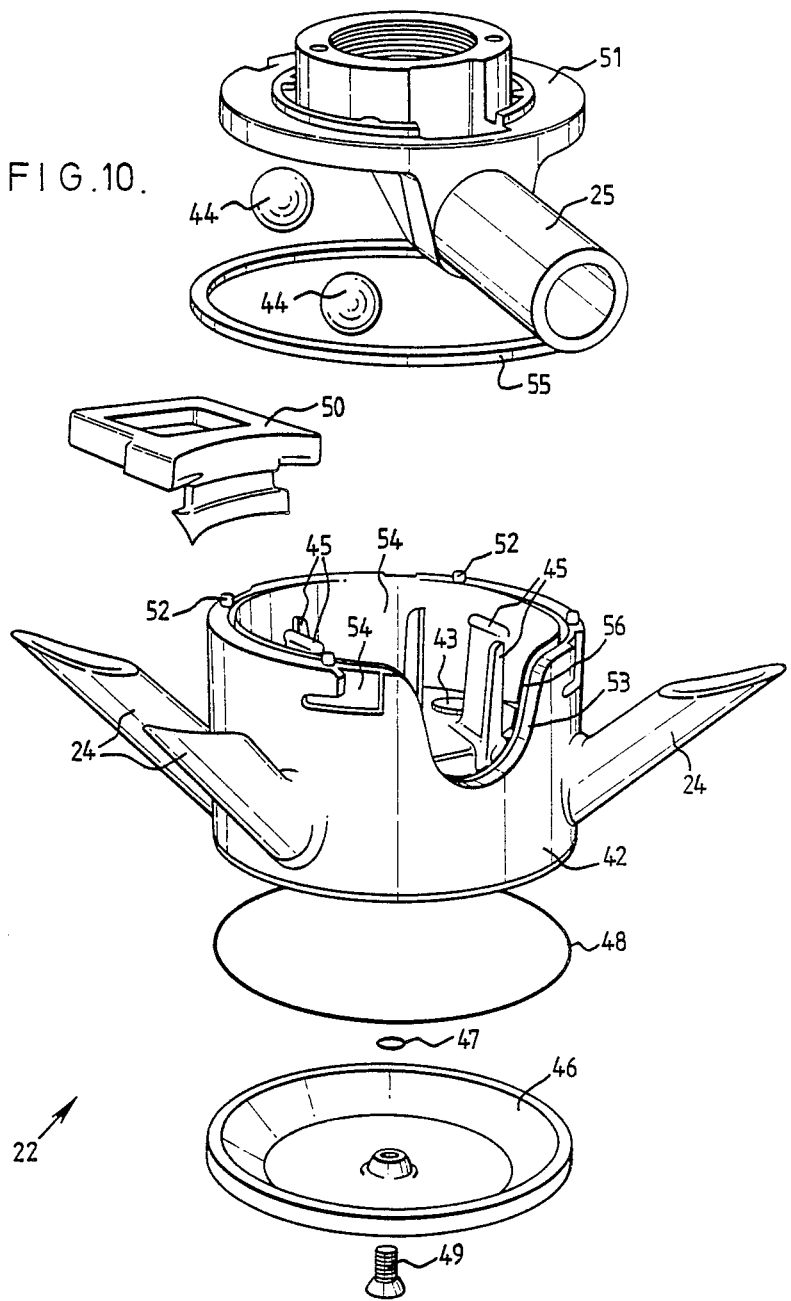

AUTOMATIC MILKING APPARATUS

BACKGROUND OF THE INVENTION

This invention relates to automatic milking apparatus.

Automatic milking apparatus includes, for each cow milking unit, a clawpiece and a cluster of four teat cups connected to the clawpiece. Each teat cup has a rigid shell and an internal flexible liner. This liner has a topmost mouthpiece diaphragm with a circular mouthpiece and a body part inside the shell body. The liner extends through the bottom of the shell body as a short milk tube. This tube is connected to the clawpiece and thence, by way of a long milk tube, to a source of steady vacuum.

An annular space, between the teat cup shell and the teat cup liner, is connected to the clawpiece by a pulse tube and thence to a source of pulsating vacuum.

For milking, the four teat cups are placed around the cow's teats, the liner mouthpiece of each teat cup being fitted over the respective teat. The teat cups are held in position during the milking operation by adhesion, due to the steady vacuum applied for the milking operation. The pulsating vacuum applied between the teat cup liner and shell causes the liner body to dilate and contract again, thus promoting the flow of milk by simulating suckling. After completion of the milking operation, the teat cup cluster is removed from the cow's teats, either manually or by automatic means.

In milking methods which are conventional at the present date, in which a continuous air bleed is provided at the clawpiece or upstream of the clawpiece, the steady vacuum induced adhesion is automatically broken when the vacuum supply is shut off at the end of milking, so that the teat cup cluster is easily removed from the milked cow.

However, a more modern milking method, known as the hydraulic milking method, has recently been introduced. In this hydraulic milking method there is no air bleed at or upstream of the clawpiece during milking, that is to say during the process of drawing milk from an individual cow. In consequence, the steady vacuum induced adhesion of the teat cup liner to the cow's teat is not broken when the vacuum supply is shut off after milking. Some other means is thus needed to break the vacuum adhesion before the teat cups can easily be removed from the milked cow.

It has been proposed, in co-pending patent application U.S. Pat. No. 8520814, to groove the surface of the teat cup liner mouthpiece, in the area where it makes contact with the surface of the cow's teat, so that, upon the displacement caused by a downward pull on the teat cup, the contact seal is broken and air is admitted around the mouthpiece, past the teat and into the liner body, thereby permitting of easy removal of the teat cup.

It has been proposed, in co-pending patent application U.S. Pat. No. 8603302, to provide one or more apertures in the mouthpiece diaphragm, each aperture having a closure stop which closes the aperture as the teat cup is fitted and opens as the teat cup is removed.

The object of the present invention is to provide automatic milking apparatus, particularly the teat cup and clawpiece components thereof, in which air may be admitted positively into the body space of the teat cup liner, at will upon the completion of the milking operation.

Accordingly, the present invention provides for automatic milking apparatus, a teat cup liner of elastomeric material having a topmost mouthpiece, a downwardly extending body part, for fitting within a teat cup rigid shell, and a tubular extension below the body part, forming a short milk tube for connection to a clawpiece, the body part of the teat cup liner having a passage therethrough providing an opening into the body interior, below the mouthpiece of the teat cup liner, whereby air may be admitted into the said body interior, at will.

The invention further provides, for automatic milking apparatus, a teat cup having a liner as described in the last preceding paragraph, fitted within a rigid shell, said shell providing for the connection of a pulse tube with the space between the liner body and the shell body, said liner passage providing for the connection of an air admission tube therewith, the air admission tube extending within the space between the liner body and the shell body and extending out of the shell inside the pulse tube.

The invention further provides, for automatic milking apparatus, a cluster of four teat cups, each as described in the last preceding paragraph, in combination with a clawpiece, said clawpiece having a pulsation block and milk flow parts, each of said teat cups having the pulse tube thereof connected to a connector of the pulsation block and having the said air admission tube within the pulse tube thereof connected to an air-flow connector provided by said clawpiece, each of said teat cups having the short milk tube extension of the teat cup liner thereof connected to a connector of the milk flow part of said clawpiece, said clawpiece further having a movable control member connected to a steady vacuum and milk flow control valve within said milk flow part of said clawpiece, and an air-inlet valve, controlling air-flow from atmosphere to the air-flow connector, being linked to the said control member, said air-inlet valve being closed when the steady vacuum and milk flow control valve is open and being open when the steady vacuum and milk flow control valve is closed.

The invention further provides methods of automatic milking consequent upon the use of the apparatus defined in the preceding paragraphs. Thus, the invention provides a method of automatic milking by which there is no air bleed at or upstream of the clawpiece during milking and, after milking and before the removal of teat cups from a cow's teats, air is admitted to the interior of the bodies of the teat cup liners by way of a passage through each liner body, between the interior and exterior thereof, and by way of an air admission passage connected to the liner body passage.

SHORT DESCRIPTION OF THE DRAWINGS

Two embodiments of the invention will be described, by way of example, with reference to the accompanying drawings, wherein the same or similar parts are indicated by the same reference numerals throughout the several drawings, and in which:

FIG. 4 is an axial cross-section view of an alternative teat cup to that shown in FIG. 1;

FIGS. 5 and 6 are part elevation, part axial cross-section views of the upper part of an alternative clawpiece to that shown in FIGS. 2 and 3;

FIG. 5 is the view showing the steady vacuum and milk-flow valve open and the air-inlet valve closed, as during a milking operation;

FIG. 6 is the view showing the steady vacuum and milk-flow valve closed and the air-inlet valve open, as at the completion of a milking operation;

FIG. 10 is an exploded, perspective view of the lower part of the clawpiece of which the upper part is shown in FIG. 5 and FIG. 6, with one member of the upper part also shown in perspective.

DESCRIPTION OF THE EMBODIMENT

Figure 1:
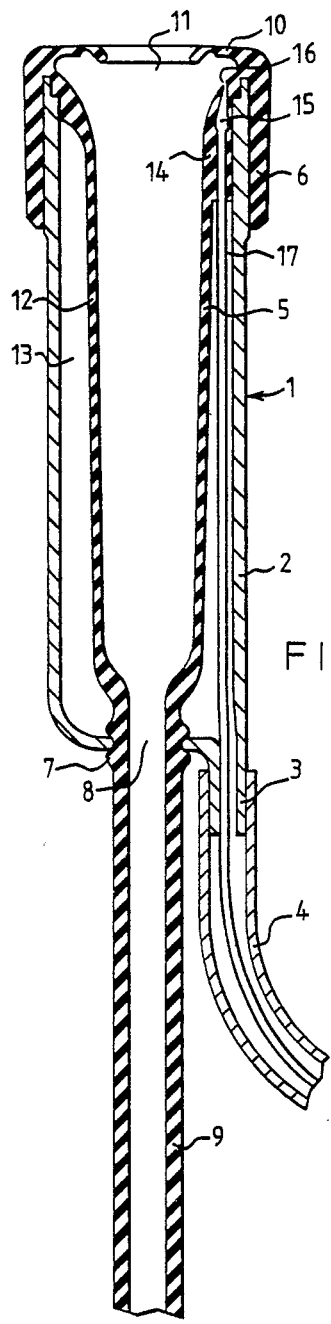
FIG. 1 is an axial cross-section view of one teat cup of a cluster of four, showing the rigid shell, elastomeric teat cup liner, with part of a short milk tube extending therefrom, part of a pulse tube connected to the teat cup shell and an air admission tube connected to a passage through the liner and extending away from the teat cup shell inside the pulse tube.

FIG. 1 shows, in axial cross-section, one teat cup 1 of a cluster of four similar composite teat cups. The teat cup 1 has a rigid shell 2, with a pulse tube connector 3 at its lower end. A pulse tube 4 is shown in part, connected at the connector 3. A teat cup liner 5 of elastomeric material fits inside the teat cup shell 2 and forms airtight seals therewith, at the top by a downwardly-extending skirt part 6 and at the bottom by an integrally moulded grommet 7 which fits tightly in an outlet hole 8 at the bottom of the shell 2. The body 12 of the liner 5 extends within the shell 2, spaced from the inside wall of the shell 2 to leave an annular space 13 between the shell 2 and the liner 5. At its top, the liner 5 has a mouthpiece diaphragm 10 with a central circular aperture 11 dimensioned to fit closely around a teat of a cow to be milked. At the bottom, below the grommet 7, the liner extends as an integrally moulded short milk tube 9.

In the parts as so far described, the teat cup 1 of the invention is of conventional construction and is used in conventional manner, being fitted on a cow's teat by the mouthpiece 11, a steady vacuum being applied to the interior of the liner body 12 by way of the short milk tube 9 and a pulsating vacuum being applied in the space 13, by way of the pulse tube 4.

However, since the apparatus of the invention is intended for hydraulic milking, no provision is made for an air bleed at or upstream of the clawpiece, to be described, during the milking operation itself. Provision is made to admit air into the interior of the liner body 12, just below the mouthpiece diaphragm 10, at will upon completion of the milking operation.

The wall of the liner 5 is made thicker in a region 14, beneath the skirt 6 and to one side, as shown at the top right in FIG. 1. Here, a passage 15 extends from the liner outer wall nearly to the inner wall at a slit orifice 16. To form the orifice 16, the residual wall material is pierced to form a short slit which, by reason of the elasticity of the liner material, is normally closed. The outer end of the passage 15 is dimensioned to receive and to hold an air admission tube 17. The air admission tube 17 passes downwardly in the space 13, out through the connector 3 and away from the teat cup 1 inside the pulse tube 4.

Figure 2:
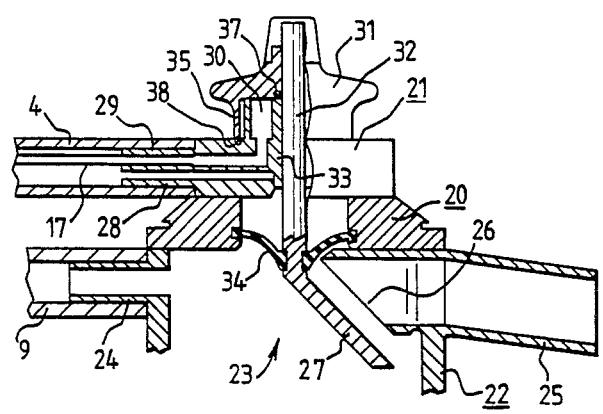
FIG. 2 is a part elevation, part axial cross-section view of a clawpiece for hydraulic milking, showing a steady vacuum and milk-flow valve open and an air-inlet valve closed, as during a milking operation.

Referring now to FIG. 2, there is shown in part, generally in axial cross-section and part in elevation, a clawpiece shown generally at 20, comprising a pulsation block part 21 and a milk flow part 22.

The pulsation block 21 is of conventional form and, whether of the simultaneous or alternate pulsation type, need not be described in detail in relation to the present invention. The milk flow part 22 of the clawpiece, in respects unrelated to the present invention and not described herein, is of known form for a clawpiece for hydraulic milking and may correspond to the multi-valve clawpiece described in U.K. Pat. No. 2,057,845.

The milk flow part 22 has a milk chamber 23, into which milk passes through a milk connector, one of four such connectors, to which the end of the short milk tube 9 of FIG. 1 is connected. The arrangement is shown diagrammatically by a milk connector 24 and the end of the short milk tube 9 fitted thereto. Milk passes out of the milk chamber 23 by way of a connector 25, which connector is connected by way of a long milk tube, not shown, to a milk tank and source of steady vacuum, in normal manner. The connector 25 extends into the body of the milk flow part 22, the inner end providing an aperture 26 which lies in a plane which is oblique to the axis of the inner portion of connector 25. A movable, plate-shaped valve 27 is provided to shut off the steady vacuum and the milk flow out of the clawpiece 20, in the position shown in FIG. 3, or permit the flow of milk and maintenance of steady vacuum within the clawpiece 20, in the position shown in FIG. 2.

The pulsation block 21 has a composite connector 28, 29, one of four such connectors, to which the ends both of the pulse tube 4 and the air admission tube 17 of FIG. 1 are connected. The part 28 provides connection of the pulse tube 4 to a source of pulsating vacuum in conventional manner. The part 29 provides connection of the air admission tube 17 to an air channel 30, which may be opened to atmosphere or closed by an air-inlet valve linked to the steady vacuum and milk flow control valve.

Figure 3:
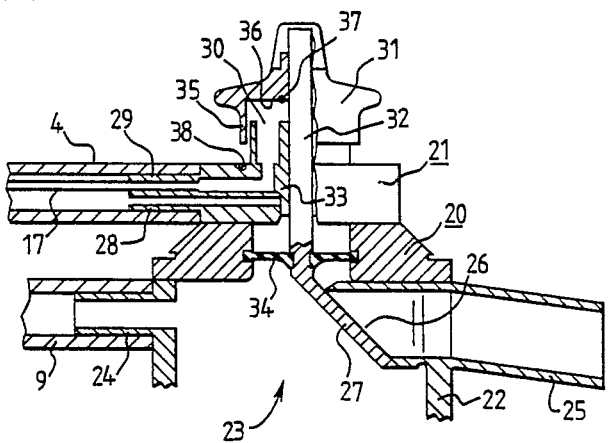
FIG. 3 is a corresponding view to FIG. 2, showing the steady vacuum and milk-flow valve closed and the air-inlet valve open, as at completion of a milking operation.

The construction of these two valves is shown in both FIGS. 2 and 3. A control knob 31 positioned on top of the pulsation block 21 has a shaft 32 which extends through a bearing block 33, formed integrally with the pulsation block 21, and carries the plate-shaped valve 27 at its lower end. Near its lower end, the shaft 32 carries a flexible diaphragm 34, the circumferential edge of which is held in the body of the clawpiece 20, as is shown in the figures. The diaphragm seals the top of the milk chamber 23 from the pulsation block part 21 and also seals the air channel 30 from the milk chamber 23 due to the leakage path between the shaft 32 and bearing block 33. The control knob 31 is partly hollowed from its bottom to provide an outer skirt 35 and a circular top face 36, referenced in FIG. 3. Into the top face 36, around the shaft 32, is fitted an "O" ring 37 in a position such that it abuts the top end of the bearing block 33, see FIG. 2. Into the top face of the pulsation block 21, aligned with the outer skirt 35 of the control knob 31, is fitted an "O" ring 38, in a position such that the bottom face of the skirt 35 will abut it, see FIG. 2.

For milking operation, the control knob 31 is depressed into the position shown in FIG. 2. The steady vacuum pressure is transmitted into the milk chamber 23 and the valve 27 is opened to permit milk flow through the connector 25. At this time, the pressure above the diaphragm 34 will be substantially at atmospheric pressure, this pressure being substantially equal to the atmospheric pressure in the air channel 30 by virtue of the leakage between the shaft 32 and bearing block 33. Vacuum pressure acting upon the underside of the diaphragm 34 will cause the control knob 31 to be held in the milk-flow position of FIG. 2. At the same time, the air-inlet valve, constituted by the "O" rings 37 and 38 and the respective abutment surfaces will be closed, so that the air channel 30 is closed to the atmosphere and air is not admitted to the air admission tube 17 nor into the interior of the teat liner body 12. Steady vacuum is transmitted by way of the short milk tube 9 to the teat liner body 12, and pulsating vacuum is transmitted from the pulsation block 21, by way of the pulse tube 4, to the space 13 of the teat cup 1, so that the milking operation proceeds in the normal manner of hydraulic milking.

Upon completion of milk flow from the cow being milked, the control knob 31 is lifted, either manually or by known automatic means as the case may be, so that the control knob 31 assumes the position shown in FIG. 3. Now, the plate-shaped valve 27 abuts the inner end of the connector 25, thereby closing the milk flow exit from the milk chamber 23 and stopping the admission of steady vacuum pressure thereto. In the raised position of the control knob 31 shown in FIG. 3, the respective abutment surfaces are removed from both "O" rings 37 and 38, the air-inlet valve formed thereby is open to admit air from the atmosphere to the air channel 30. Air flows therefrom, by way of the air admission tube 17 to the passage 15. Since near vacuum pressure still persists in the interior of the teat cup liner 5, which at this time still retains the cow's teat which has been milked, air will pass from the passage 15, through the slit orifice 16 into the interior of the teat cup liner 5, beneath the mouthpiece diaphragm 10 and around the cows's teat. Accordingly, the pressure within the teat cup liner 5 will rapidly rise to the atmospheric pressure outside the teat cup 1 and the easy removal of the teat cup 1, and correspondingly the other three teat cups of the cluster, is facilitated. In practice, the control knob 31 is raised slowly, from its FIG. 2 position to its FIG. 3 position, as will tend to be the case naturally, due to the initial vacuum pressure below the diaphragm 34. Closure of the vacuum and milk flow valve 27, 26 thus proceeds progressively. This enables residual milk, still in the bottom of the teat cup liner body 12 and in the short milk tube 9, to flow through the milk chamber 23 and out through the connector 25, while the valve 27, 26 is still partially open. The air inlet valve to the air channel 30 is, of course, opened immediately the respective abutment surfaces are removed from the "O" rings 37 and 38, so that full flow of air is permitted through the air admission tube 17. This flow progressively equalizes the air pressure within the teat cup liner 5 with the atmospheric pressure outside.

FIG. 4 shows a teat cup 1 having a rigid shell 2, connector 3, pulse tube 4 and teat cup liner 5, as shown in the teat cup of FIG. 1. The liner 5 similarly has a passage 15 extending through the liner wall region 14. In this example, the orifice 16 is a permanently-open orifice. The air admission tube 17 is similarly connected to the passage 15 as in the example of FIG. 1 and similarly passes out of the teat cup by way of the space 13 and pulse tube 4.

Although the teat cup liner of FIG. 1, with the normally-closed orifice 16, is the preferred embodiment of teat cup liner, it is presently thought to be unimportant whether milk should enter the passage 15, since it is ejected by the admission of air through the air admission tube 17. The permanently-open orifice 16 of FIG. 4 is thus an acceptable alternative.

A further alternative teat cup envisaged, not illustrated in the accompanying drawings, is one in which the rigid shell with pulse tube, teat cup liner with short milk tube and air admission tube are of unitary construction, forming a single replaceable unit.

Figure 6:
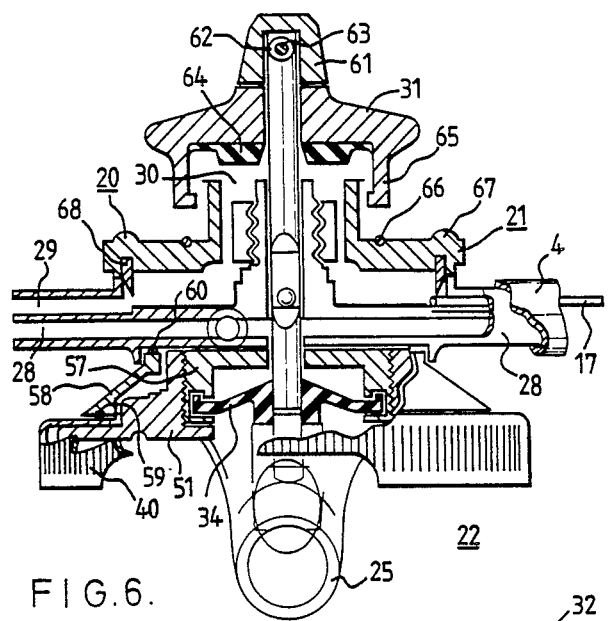

Comparing now the clawpiece of FIG. 5 and FIG. 6 with the clawpiece of FIG. 2 and FIG. 3, there is shown in FIG. 5 and FIG. 6 a clawpiece for hydraulic milking shown generally at 20. This comprises an upper part 21, which includes a conventional pulsation block, and a lower part, represented by the numeral 22, to which the upper part 21 is secured by a locking ring 40. The lower part 22 of the clawpiece 20 is shown in detail, in the exploded perspective view of FIG. 10.

In FIG. 10, the lower part 22 of the clawpiece comprises a base moulding 42 having an interior milk chamber 23. Four milk connectors 24, three of which are seen in the view of FIG. 10, are spaced around the moulding circumference and dimensioned to receive the ends of the four short milk tubes 9 of a cluster of teat cups. The entry of the connectors 24 into the chamber 23 form valve seatings 43, one of which is seen in the view of FIG. 10. Each valve seating 43 receives a steel ball 44, two of which are shown. These are normally retained by ball guides 45. A base cover 46 holds a small sealing ring 47 and a large sealing ring 48 and is secured to the underside of the moulding 42 by a retaining screw 49. A clawpiece hanging bracket 50 attaches to the moulding 42 at the side thereof. The moulding 42 indexes with the underside of a top moulding 51, which includes the connector 25 and which is shown as a member of the clawpiece upper part 21 in FIG. 5 and FIG. 6. The indexing is provided by moulded pins 52 which, together with the cut-away 53, shaped to receive the neck of the connector 25, ensure that lugs, which extend inwardly from the lower edge of the locking ring 40, engage four locking indentations 54 spaced around the side of the moulding 42 below its top edge. The moulding 42 is thereby locked to the underside of the top moulding 51 with an intermediate seal 55, shown as a ring seal in the drawing but which, when fitted in place, occupies a top edge slot 56, which follows the cut-away 53.

Returning to FIG. 5 and FIG. 6, there is shown the clawpiece top moulding 51, which includes the connector 25 and which retains the locking ring 40. Threaded internally, the moulding 51 holds a diaphragm retaining ring 57 which retains the peripheral edge of the diaphragm 34 mounted on the control shaft 32.

A skirt moulding 58 is fitted above the moulding 51 with an intermediate skirt sealing ring 59. The pulsation block is positioned above the skirt moulding 58 with an intermediate skirt sealing ring 60.

The pulsation block 21 is of conventional form, of either simultaneous or alternate pulsation type, and is provided with four composite connectors 28, 29, two of which are seen in the views of FIG. 5 and FIG. 6. The part 28 provides connection of a pulse tube 4 to a source of pulsating vacuum in conventional manner. The part 29 provides connection of an air admission tube 17 to the air channel 30.

The control knob 31 is attached to the control shaft 32 near its top end and is held by a steel dome cap 61. The dome cap 61 and shaft 32 both have a transverse hole 62 to receive a pull ring 63.

The interior underside of the control knob 31 has an annular seal pad 64 dimensioned to close the air channel 30 at the top, when the control knob 31 is in the position shown in FIG. 5. In this position of the control knob 31 also, an outer skirt portion 65 of the knob 31 abuts and seals against an air admission sealing ring 66 retained in a groove on the top face of a pulsation block screw top 67.

The interior underside of the pulsation block screw top 67 has a circular steel knife edge 68 moulded integrally therewith with the edge pointing downwardly. In assembly, as the screw top is tightened onto the pulsation block, the knife edge cuts into the top surface of all the air admission tubes 17, as is shown at the right hand side of FIG. 5 and FIG. 6, thereby to retain the ends of the air admission tubes 17 very securely in their connectors 29.

The control elements of the clawpiece 20 upper part 21 have two steady control positions, as represented by the two figures FIG. 5 and FIG. 6. FIG. 5 shows the position for milking, FIG. 6 shows the position set after milking.

Figure 7:
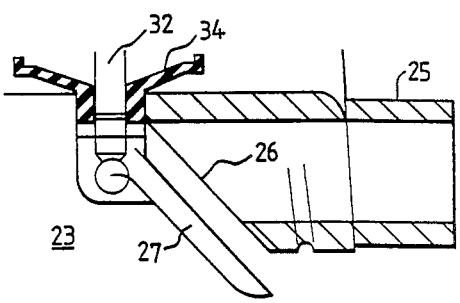
FIG. 7 is a detail view of the clawpiece parts of FIG. 5, part elevation and part cross-section in a plane perpendicular to that of FIG. 5, showing the steady vacuum and milk flow valve open.

The detail view of FIG. 7, corresponding to the control positions of FIG. 5, shows a part of the connector 25, itself part of the moulding 51, at its inner end where it extends into the milk chamber 23, providing an oblique aperture 26. The lower end of the control shaft 32, below the diaphragm 34, carries the plate-shaped valve 27, which in the position of FIG. 7 is open to permit the maintenance of steady vacuum in the milk chamber 23, from the long milk tube, not shown, connected to the connector 25, and also the free passage of milk from the milk chamber 23 into the long milk tube.

At this time, the control knob 31 is in its downward position, the seal pad 64 closes the top of the air channel 30 and the knob skirt 65 seals against the sealing ring 66.

Figure 8:
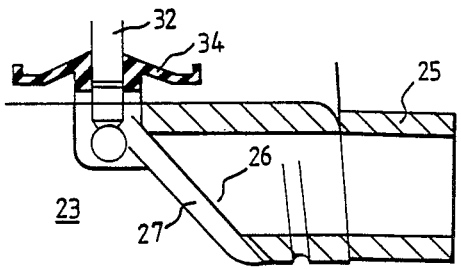
FIG. 8 is a corresponding detail view of the clawpiece parts of FIG. 6, showing the steady vacuum and milk flow valve closed.

The detail view of FIG. 8, corresponding to the control positions of FIG. 6, shows the connector 25 aperture 26 closed by the valve 27.

At this time, the control knob 31 is in its upper position, the seal pad 64 is lifted free of the top of the air channel 30 and the control knob skirt 65 is lifted free of the sealing ring 66, thereby admitting air to the air channel 30, to the connector parts 29 and thence to the air admission tubes 17 and the interior of the teat cup liners 5.

With the clawpiece construction shown in FIG. 5 and FIG. 6, the control transition from the FIG. 5 position to the FIG. 6 position is achieved in two stages. The first, and intermediate, stage is achieved by the initial lifting of control knob 31, whereby the lifting of seal pad 64 and the breaking of the seal with sealing ring 66 is achieved with only a partial closure of the valve 27 on the aperture 26. This first stage admits air to the air channel 30, air admission tubes 17 and to the teat cup liner mouthpieces. This eases removal of the teat cup cluster while still permitting milk flow from the teat cup liner bodies, from the short milk tubes 9 and from the milk chamber 23. Completion of the movement of the control knob 31 completes the control action by closing the valve 27.

Figure 9:
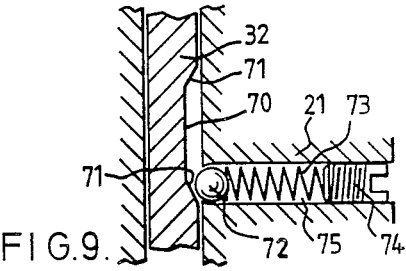
FIG. 9 is a detail view, part in elevation and part in axial cross-section, showing a two-stage indexing of the clawpiece valve control shaft.

The two-stage operation of the control members of the clawpiece is facilitated by a control shaft position indexing arrangement shown in FIG. 9. The shaft 32 has a flat portion 70 with sloping sides 71 milled in one face. An indexing steel ball 72 is housed in a bore 75 within the body of the pulsation block and the ball 72 is spring loaded by a helical spring 73 and tension screw 74 also housed in the pulsation block bore 75. The milled flat 70 is positioned, in relation to the longitudinal movement of the shaft 32, so that the first stage of movement is easily made and a noticeable further effort is required for the subsequent movement.

The method of hydraulic milking employing apparatus as described herein requires the fitting of teat cups to a cow in conventional manner. The control knob 31 is set as is shown in FIG. 2 or FIG. 5, whereby steady vacuum is admitted to the milk chamber 23 and air is excluded from the air admission tubes 17 and from the associated teat cup liners. Pulsating vacuum is supplied to the pulse tubes 4 from the pulsation block of the clawpiece and milking proceeds in the normal manner for hydraulic milking. In this manner of milking, as has been explained, no air admission is permitted at or upstream of the clawpiece and the ball valves 44 operate to seal the milk intake connectors 24, preventing any reverse flow of milk. At the completion of the milking of a cow, the clawpiece control knob 31 is moved, first to release air into the air-admission tubes 17, to release the vacuum and to facilitate removal of the teat cups, and secondly to close the milk outlet from the milk chamber 23 of the clawpiece and to shut off the steady vacuum supplied through the long milk tube.

I claim:

1. An automatic milking apparatus including a clawpiece, a cluster of teat cups, each with a teat cup shell housing, a teat cup liner, and short milk tubes connecting each liner with the clawpiece;

said clawpiece including, for each short milk tube connected thereto, a non-return valve for permitting milk flow in the teat cup in a direction towards the clawpiece, away from the teats, and for preventing milk-flow in the opposite direction;

each teat cup liner and short milk tube connected thereto forming an airtight passageway precluding air admission into the apparatus upstream of the respective clawpiece valve during a milking operation; and each teat cup liner including an air admission passage extending from the interior of the liner to an exterior liner part within the corresponding teat cup shell, and an air admission tube extending from the air admission passage to an air admission control means which is operative, at will, to prevent air admission during a milking operation and to permit air admission upon completion of a milking operation.

2. A method of automatic milking using an apparatus including a clawpiece, a cluster of teat cups each having a teat cup shell housing, a teat cup liner, short milk tubes connecting each liner to the clawpiece, and non-return valves included in said clawpiece for permitting milk-flow in the teat cup in the direction of the clawpiece, away from the teats, and for preventing milk-flow in the opposite direction, said method including the steps of;

fitting the teat cups to teats;

performing a milking operation while excluding the admission of air upstream of the claw piece valves; and at the end of the milking operation and before the removal of the teat cups from the teats, admitting air to the interiors of the teat cup liners in those regions of the interiors of the liners occupied by the teats.

* * * * *